United States Patent [19]

Amagishi

[11] Patent Number: 4,677,417
[45] Date of Patent: Jun. 30, 1987

[54] TABLET TYPE INPUT DEVICE
[75] Inventor: Yoshitada Amagishi, Miyagi, Japan
[73] Assignee: Alps Electric Co., Ltd., Japan
[21] Appl. No.: 806,097
[22] Filed: Dec. 6, 1985
[51] Int. Cl.$^4$ ............................................. H01C 7/22
[52] U.S. Cl. ................................ 338/114; 200/86 R; 200/292
[58] Field of Search ............... 200/5 R, 5 A, 159 B, 200/86 R, 292, 302.1, 302.2, 333, 275, 279; 338/99, 108, 114; 340/635 R, 365 C, 365 VL, 712

[56] References Cited

U.S. PATENT DOCUMENTS

| | | | |
|---|---|---|---|
| 3,911,215 | 10/1975 | Hurst | 200/86 R |
| 4,194,097 | 3/1980 | Bradam | 200/5 A |
| 4,410,887 | 10/1983 | Stolov | 340/784 |
| 4,497,989 | 2/1985 | Miller | 200/86 R |
| 4,529,959 | 7/1985 | Ito | 338/295 |

Primary Examiner—G. P. Tolin
Attorney, Agent, or Firm—Guy W. Shoup

[57] ABSTRACT

An input device of the tablet type comprising opposed planar resistance bodies with a plurality of dot spacers interposed therebetween, plate-like insulating bodies made of soft and elastic material and provided respectively and integrally on the outsides of the planar resistance bodies, and a fixed plate for securing and supporting one of the plate-like insulating bodies, and characterized in that a plurality of cavities are formed in an abutment area between the one plate-like insulating body and the fixed plate by which each dot spacer portion can sink when a force is applied, whereby entry of information relating to the dot spacer portion also is allowed.

2 Claims, 6 Drawing Figures

FIG. 3
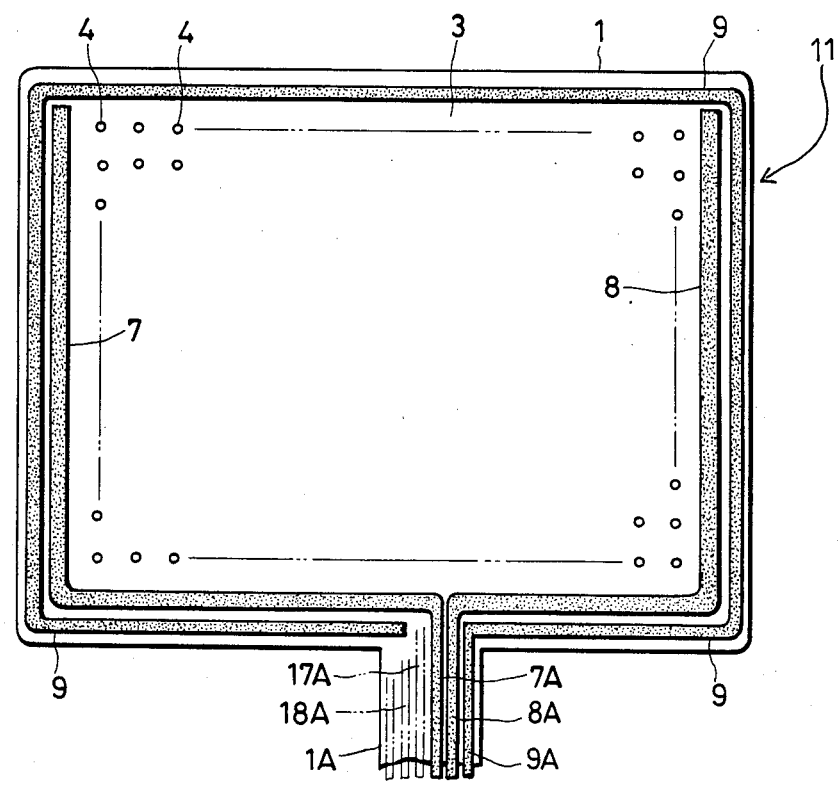
PRIOR ART FIG. 4
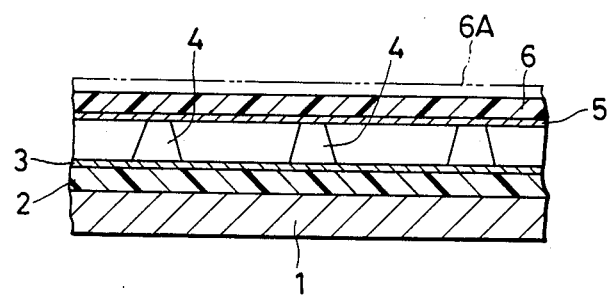

TABLET TYPE INPUT DEVICE

BACKGROUND OF THE INVENTION

1. Field of the Invention

This invention relates to an input device of the tablet type wherein in response to pushing of a given location on a tablet serving as an input board by the use of a push pen the positional information of the pushed location is entered.

2. Description of the Prior Art

Hitherto, various types of input devices, such as the key input type or tablet input type, are connected to and used with microcomputers, such as personal computers or TV game sets, in compliance with the purpose of use.

FIGS. 3 through 6 show an example of the tablet type input device. The illustrated input device comprises opposed lower planar resistance body and upper planar resistance body with a plurality of dot spacers interposed therebetween which are distributed substantially over the whole face, and is designed so that as any desired point is pushed from the external thereby these resistance bodies becoming into contact with each other a variation of potential at that contacted point is detected and entered in terms of the positional information.

Describing more clearly, in FIG. 3, 1 is a fixed plate of square shape, and 1A is a lead-wire outgoing section. As shown in FIG. 4, on the fixed plate 1 there are piled one upon another a lower insulating member 2, lower planar resistance body 3, dot spacers 4, 4, ..., upper planar resistance body 5, and upper insulating member 6, in this order as viewed from the bottom upward.

As shown in FIG. 3, on the lower planar resistance body 3 terminal electrodes 7 and 8 of strip shape are provided on the sides thereof. 7A and 8A are lead wires of the terminal electrodes 7 and 8, respectively. On the outside of these terminal electrodes 7 and 8 an earth electrode 9 for prevention of entrance of noise is provided so as to surround the whole of the lower planar resistance body 3. 9A is a lead wire of the earth electrode 9 and 6A is a protection sheet.

Similarly to the lower planar resistance body 3, at respective vertical marginal portions in FIG. 3 of the upper planar resistance body 5 laterally-extending terminal electrodes (not shown) of strip shape are provided, and their lead wires 17A and 18A are led outward through the lead-wire outgoing section 1A. In this body 5, also, an earth electrode (not shown) similar to the earth electrode 9 is provided on the outside of the terminal electrodes.

Each of these insulating members 2, 6 and planar resistance bodies 3, 5 is made by soft material having elasticity, the lower planar resistance body 3 is secured integrally to the lower insulating member 2, and the upper planar resistance body 5 is secured integrally to the upper insulating member 6.

In operation of the input device, a given location on the tablet of the foregoing configuration is pushed by a push pen 10, as shown in FIG. 5. As the result of pushing, the upper resistance body 5 is bent together with the upper insulating member 6 to come into contact with the lower resistance body 3, as illustrated in the drawing. In this connection the device is designed so that respective variations of resistance between the terminal electrodes are measured while selecting each in accordance with a predetermined routine, whereby the location where the push pen 10 makes contact can be specified instantly.

In the conventional device of the table type described hereinabove, however, because a plurality of dot spacers 4, 4, ... 4 print-molded by hard material such as silicon resin are arranged between the upper and lower planar resistance bodies 5 and 3, if the push pen 10 is made to abut on a spot above the dot spacer 4 as shown in FIG. 6, for example, the upper insulating member 6 does not bend and the planar resistance bodies 5 and 3 do not come into contact with each other really; thus each spot as above creates a so-called insensitive zone inconveniently. Further, because the upper insulating member 6 has a limitation in the extent of bend, the insensitive zone is comparatively large and there is the disadvantage that the resolution of the device as a whole can not be made high.

SUMMARY OF THE INVENTION

It is an object of the present invention to overcome such inconveniences as above of the conventional device and to provide an input device of the tablet type whose insensitive zone is reduce remarkably.

To achieve the foregoing object, the present invention provides an input device of the tablet type comprising opposed planar resistance bodies with a plurality of dot spacers interposed therebetween, plate-like insulating bodies made of soft and elastic material and provided respectively and integrally on the outsides of the planar resistance bodies, and a fixed plate for securing and supporting one of the plate-like insulating bodies, and characterized in that a plurality of cavities are formed in an abutment area between the one plate-like insulating body and the fixed plate by which each dot spacer portion can sink when a force is applied.

BRIEF DESCRIPTION OF THE DRAWINGS

FIG. 3 is a plan view of the conventional device with a portion omitted;

FIG. 4 is a partial enlarged sectional view of the device shown in FIG. 3; and

DESCRIPTION OF THE PREFERRED EMBODIMENT

Figure 1:
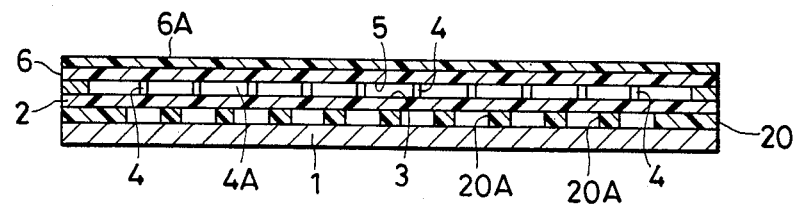
FIG. 1 is a sectional view showing an embodiment of the present invention.

An embodiment of the present invention will now be described with reference to FIGS. 1 and 2 in which elements corresponding to those of the conventional device bear the same reference numerals as those.

Figure 2:
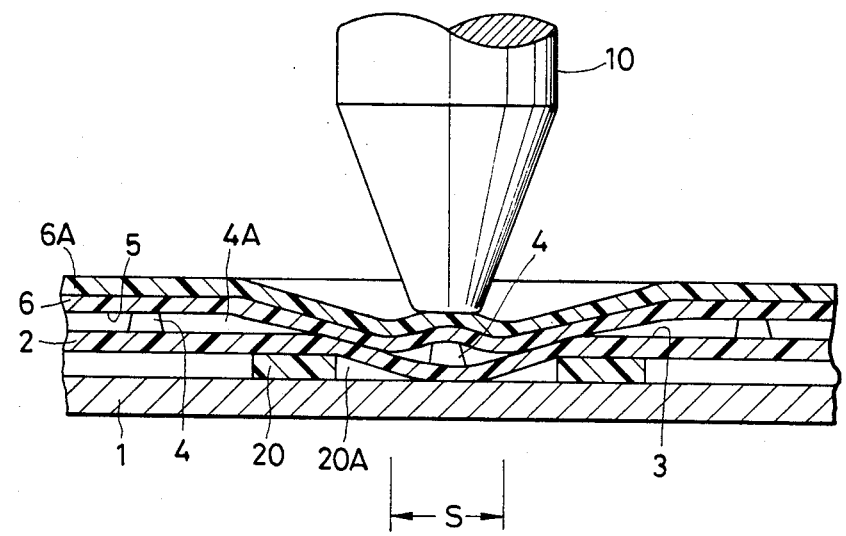
FIG. 2 is an explanation view showing one operated state of the device shown in FIG. 1.
Figure 5:
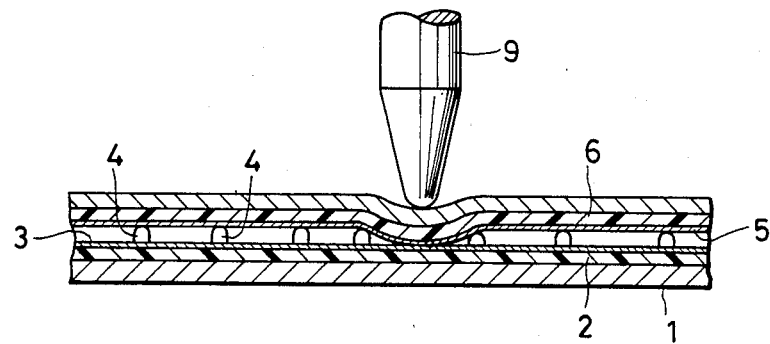
FIGS. 5 and 6 are explanation views showing the operated states of the device shown in FIGS. 3 and 4.

In FIG. 1, on a fixed plate 1 there are piled one upon another a spacer member 20, lower insulating member 2 serving as one plate-like insulating member, lower planar resistance body 3, dot spacers 4, 4, ..., upper planar resistance body 5, upper insulating member 6 serving as the other plate-like insulating member, and protection sheet 6A, in this order as viewed from the bottom upward.

In the embodiment, the spacer member 20 is shaped like a plate and bored with a plurality of thru-holes 20A of comparatively large diameter which correspond in position to the dot spacers 4, 4, ... 4. Among the elements, the spacer member 20 and fixed plate 1 are made by comparatively hard material, whereas the other elements are made by material having flexibility as is the case of the foregoing conventional device. The lower insulating member 2 is secured at its periphery via a joint section to the fixed plate 1, so that the dot spacers 4 correspond fixedly to the corresponding thru-holes 20A of the spacer member 20. 4A indicates cavities formed by the dot spacers. The remaining configurational portion not mentioned above is the same as that of the conventional device.

Figure 6:
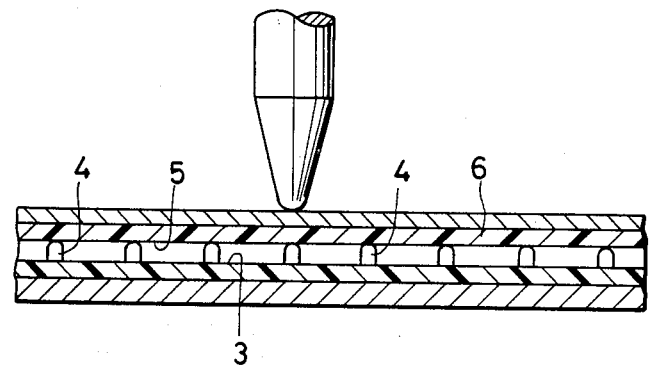

Action of the embodiment will now be described. As a push pen 10 is positioned similarly to the case of the conventional device shown in FIG. 6 and pushed down, the whole of the dot spacer (4) portion sinks into the thru-hole 20A of the spacer member 20 as shown in FIG. 2. As a result, the planar resistance bodies 3 and 5 abut on over a circular area at the periphery of the dot spacer 4 thereby to come into contact with each other. Therefore, the insensitive zone, appeared at a portion above the dot spacer 4 in the conventional device, can be made remarkably small as indicated by S in FIG. 2; accordingly, the present invention produces the advantage that the resolution of the device as a whole can be improved. Further, because upon shifting of the push pen 10 on the tablet the dot spacer 4 can sink very easily as the push pen comes to the position of that dot spacer 4, the feeling of sliding on a rugged surface which is peculiar to the conventional device disappears, and the tablet bringing comparatively smooth feeling and good operability can be realized.

Although in the embodiment the spacer member 20 is independent of the fixed plate 1, the present invention should not be limited to such a configuration, and the spacer member may be made by the same material as that of the fixed plate and formed in a single body by molding. Further, the thru-hole 20A is not necessary to be as illustrated in the drawing, and a recess may be formed in place of the thru-hole, which permits comparatively easy sinking of the portion of the dot spacer 4 upon application of an external force and returns to its original state by its own strength.

As is apparent from the foregoing description, the input device of the table type according to the present invention comprises the opposed planar resistance bodies with a plurality of dot spacers interposed therebetween, the plate-like insulating bodies made of soft and elastic material and provided respectively and integrally on the outsides of the planar resistance bodies, and the fixed plate for securing and supporting one of the plate-like insulating bodies, and is characterized in that a plurality of cavities are formed in an abutment area between the one plate-like insulating body and the fixed plate by which each dot spacer portion can sink when a force is applied, whereby entry of information relating to the dot spacer portion also is allowed, so that there can be provided the input device of the tablet type whose resolution and operability are markedly improved as a whole.

While the preferred embodiment has beed described, variations thereto will occur to those skilled in the art within the scope of the present inventive concepts which are delineated by the following claims.

What is claimed is:

1. An input device of the tablet type comprising:
   first and second planar resistance sheets with a plurality of dot spacers interposed therebetween;
   first and second flexible insulating sheets provided on the outsides of said first and second resistance sheets, respectively;
   a fixed plate on one side of one of said insulating sheets;
   a spacer plate provided between said fixed plate and said one insulating sheet and having a plurality of cavities therein each disposed under the area of one of said dot spacers such that when a touching object is pressed against the surface of the other of said insulating sheets on an area of a dot spacer, said insulating sheets and resistance sheets and dot spacer sink into the corresponding cavity into abutment with said fixed plate so as to bring the resistance sheets in a peripheral area around the area of the dot spacer into electrical contact,
   whereby the insensitive areas of said input tablet where no input is registered when the tablet is pressed by the touching object are minimized.

2. An input device of the tablet type as set forth in claim 1, wherein said spacer plate and said fixed plate are made of the same material and comprise a single body.

* * * * *